(12) United States Patent
Maes

(10) Patent No.: US 7,216,351 B1
(45) Date of Patent: May 8, 2007

(54) SYSTEMS AND METHODS FOR SYNCHRONIZING MULTI-MODAL INTERACTIONS

(75) Inventor: Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/507,526

(22) Filed: Feb. 18, 2000

Related U.S. Application Data

(60) Provisional application No. 60/158,777, filed on Oct. 12, 1999, provisional application No. 60/128,081, filed on Apr. 7, 1999.

(51) Int. Cl.
*G06F 13/00* (2006.01)
(52) U.S. Cl. ............... 719/328; 719/310; 719/312; 719/313; 718/100
(58) Field of Classification Search ......... 709/310; 718/1, 100, 101; 719/310, 311, 312, 313, 719/328
See application file for complete search history.

(56) References Cited

U.S. PATENT DOCUMENTS

| | | | | |
|---|---|---|---|---|
| 5,632,002 | A * | 5/1997 | Hashimoto et al. | 704/231 |
| 5,640,488 | A * | 6/1997 | Junqua et al. | 704/245 |
| 5,748,186 | A | 5/1998 | Raman | |
| 6,118,888 | A * | 9/2000 | Chino et al. | 382/118 |
| 6,119,147 | A * | 9/2000 | Toomey et al. | 709/204 |
| 6,253,177 | B1 * | 6/2001 | Lewis et al. | 704/235 |
| 6,311,159 | B1 * | 10/2001 | Van Tichelen et al. | 704/275 |
| 6,415,256 | B1 * | 7/2002 | Ditzik | 704/231 |
| 6,523,061 | B1 * | 2/2003 | Halverson et al. | 709/202 |
| 6,570,555 | B1 * | 5/2003 | Prevost et al. | 345/156 |
| 6,606,599 | B2 * | 8/2003 | Grant et al. | 704/275 |
| 6,691,151 | B1 * | 2/2004 | Cheyer et al. | 709/202 |
| 6,859,451 | B1 * | 2/2005 | Pasternack et al. | 370/352 |
| 6,885,736 | B2 * | 4/2005 | Uppaluru | 379/88.17 |

* cited by examiner

*Primary Examiner*—William Thomson
*Assistant Examiner*—Andy Ho
(74) *Attorney, Agent, or Firm*—F.Chau & Associates LLC; Frank V. DeRosa

(57) ABSTRACT

System and methods for synchronizing interactions between mono-mode applications, different modes of a multi-modal application, and devices having different UI modalities. In one aspect, a multi-modal shell coordinates multiple mode processes (i.e. modalities) of the same application or multiple applications through API calls, whereby each mode process registers its active commands and the corresponding actions in each of the registered modalities. The multi-modal shell comprises a registry that is implemented with a command-to-action table. With the execution of a registered command, each of the corresponding actions are triggered to update each mode process accordingly, and possible update the registry to support new commands based on the change in state of the dialog or application. In another aspect, separate applications (with UI of different modalities) are coordinated via threads (e.g., applets) connected by socket connections (or virtual socket connections implemented differently). Any command in one mode triggers the corresponding thread to communicate the action to the thread of the other application. This second thread modifies accordingly the state of the second process mode. The threads are updated or replaced by new threads.

37 Claims, 9 Drawing Sheets

SYSTEMS AND METHODS FOR SYNCHRONIZING MULTI-MODAL INTERACTIONS

This application is based on provisional applications U.S. Ser. No. 60/128,081, filed on Apr. 7, 1999 and U.S. Ser. No. 60/158,777, filed on Oct. 12, 1999.

BACKGROUND

The present invention relates generally to systems and methods for synchronizing interactions between multi-modal user interfaces (UI) and applications and, more particularly, to system and methods for managing information exchanges between mono-mode applications having different modalities and between different modes of a multi-modal application.

The computing world is presently evolving towards an era where billions of interconnected pervasive clients communicate with powerful information servers. Indeed, the coming millennium will be characterized by the availability of multiple information devices that make ubiquitous information access an accepted fact of life. The evolution of the computer world towards billions of pervasive devices interconnected via the Internet, wireless networks or spontaneous networks (such as Bluetooth and Jini) will revolutionize the principles underlying man-machine interaction. This evolution will mean that soon, personal information devices will offer ubiquitous access, bringing with them the ability to create, manipulate and exchange any information anywhere and anytime using interaction modalities most suited to the user's current needs and abilities. Such devices will include familiar access devices such as conventional telephones, cell phone, smart phone, pocket organizers, PDAs and PCs, which vary widely in the interface peripherals they use to communicate with the user. At the same time, as this evolution progresses, users will demand a consistent look, sound and feel in the user experience provided by these various information devices.

The increasing availability of information, along with the rise in the computational power available to each user to manipulate this information, brings with it a concomitant need to increase the bandwidth of man-machine communication. Users will come to demand multi-modal interaction in order to maximize their interaction with information devices in hands-free, eyes-free environments. In addition, the availability of a plethora of information devices will encourage multiple parallel interactions with electronic information akin to what users expect today in the world of traditional human-intermediated information interchange. Realizing these goals will require fundamental changes in the user interface, lacking this, users will be unable to access, act on, and transform information independently of the access device.

Information being manipulated via such devices might be located on the local device or accessible from a remote server via the network using open, interoperable protocols and standards. Usage of such open standards also leads to a seamless integration across multiple networks and multiple information sources such as an individual's personal information, corporate information available on private networks, and public information accessible via the global Internet. This availability of a unified information source will define productivity applications and tools of the future. Indeed, users will increasingly interact with electronic information, as opposed to interacting with platform-specific software applications as is currently done in the world of the desktop PC.

Information-centric computing carried out over a plethora of multi-modal information devices will be essentially conversational in nature and will foster an explosion of conversational devices and applications. This trend towards pervasive computing goes hand-in-hand with the miniaturization of the devices and the dramatic increases in their capabilities.

With the pervasiveness of computing causing information appliances to merge into the users environment, the user's mental model of these devices is likely to undergo a drastic shift. Today, users regard computing as an activity that is performed at a single device like the PC. As information appliances abound, user interaction with these multiple devices needs to be grounded on a different set of abstractions. The most intuitive and effective user model for such interaction will be based on what users are already familiar with in today's world of human-intermediated information interchange, where information transactions are modeled as a conversation amongst the various participants in the conversation. It is to be noted that the term "conversation" is used to mean more than speech interaction. Indeed, the term "conversation" is used to encompass all forms of information interchange, where such interchange is typically embodied by one participant posing a request that is fulfilled by one or more participants in the conversational interchange.

Because such conversational interactions will include devices with varying I/O capabilities, ranging from the ubiquitous telephone characterized by speech-only access to personal organizers with limited visual displays, traditional GUI-based desktop PC clients will be at a significant disadvantage; the user interface presented by such software maps poorly if at all to the more varied and constrained interaction environments presented by information appliances. Moreover, pervasive clients are more often deployed in mobile environments where hands-free or eyes-free interactions are desirable. Accordingly, conversational computing will become indispensable in the near future. Conversational computing is inherently multi-modal and often expected to be distributed over a network.

Thus, conversational computing also defines an inflection point in personal information processing and is likely to lead to a revolution in all aspects of computing more significant than what was observed in the transition from mainframe based computing to graphical workstations in the mid-1980's.

The ability to access information via a multiplicity of appliances, each designed to suit the user's specific needs and abilities at any given time, necessarily means that these interactions will exploit all available input and output modalities to maximize the bandwidth of man-machine communication.

Accordingly, a system and method that provides coordinated, synchronized, multi-modal user interaction for user interfaces that work across these multiplicity of information appliances is highly desirable. Indeed, such a system and method should allow a user to interact in parallel with the same information via a multiplicity of appliances and user interfaces, with a unified, synchronized view of information across the various appliances that the user deploys to interact with information.

SUMMARY OF THE INVENTION

The present invention is directed to system and methods for synchronizing interactions between multi-modal user interfaces (UI) and applications and, more particularly, to system and methods for managing information exchanges between applications of different modalities and between different modalities of a multi-modal application.

In one aspect of the present invention, a system for synchronizing multi-modal interactions comprises a multi-modal shell which coordinates multiple mode processes (i.e. modalities) of the same application or multiple applications through API calls, whereby each mode registers its active commands and the associated actions. A multi-modal shell comprises a registry that is implemented with a command-to-action table. With the execution of a registered command, each of the corresponding actions are triggered to update each mode process accordingly, and possible update the registry to support new commands based on the change in state of the dialog or application.

In another aspect, the multi-modal shell API comprises a mechanism for converting a mono-mode application to a multi-modal application. Using the mechanism, a GUI application, for example, may be speech-enabled by registering the active commands of the GUI application and building a grammar for the registered commands to support the commands in a speech modality.

In yet another aspect, the multi-modal shell API comprises a mechanism for building a multi-modal application by directly programming the registry to build a registration table having user-defined commands and corresponding actions for each of the modalities of the multi-modal application.

In another aspect, separate applications (with UI of different modalities) are coordinated via threads (e.g., applets) connected by socket connections (or virtual socket connections implemented differently) (i.e., communication protocols are implemented between the threads to coordinate the multi-modal interactions). Any command in one mode triggers the corresponding thread to communicate the action to the thread of the other application. This second thread modifies accordingly the state of the second process mode. The threads are updated or replaced by new threads upon a state change of their respective mode applications.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the system modules and method steps described herein may be implemented in various forms of hardware, software, firmware, special purpose processors, or a combination thereof. The present invention is preferably implemented as an application (or distributed application) comprising program instructions that are tangibly embodied on one or more program storage devices (e.g., magnetic floppy disk, RAM, ROM, CD ROM and/or Flash memory) and executable by any device or machine comprising suitable architecture (such as PDAs (personal digital assistant). It is to be further understood that, because some of the system modules and process steps depicted in the accompanying Figures are preferably implemented in software, the actual connections between such components may differ depending upon the manner in which the present invention is programmed. Given the teachings herein, one of ordinary skill in the related art will be able to contemplate these similar implementations or configurations of the present invention.

Figure 1:
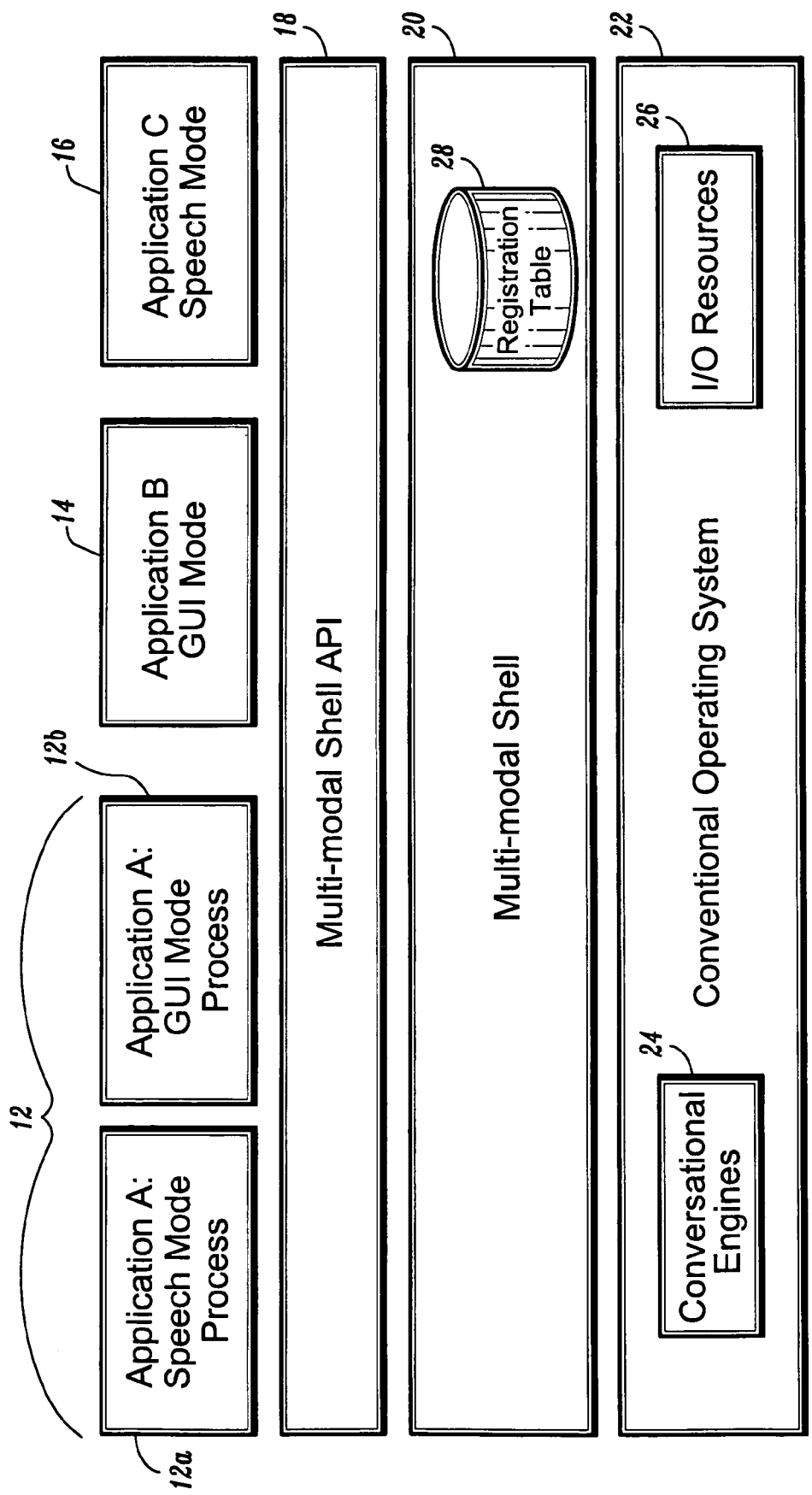
FIG. 1 is a block diagram of system for synchronizing multiple mode processes using a multi-modal shell according to an embodiment of the present invention.

Referring now to FIG. 1, a block diagram illustrates a system 10 for synchronizing multiple mode processes using a multi-modal shell according to an embodiment of the present invention. More specifically, the diagram of FIG. 1 illustrates abstract programming layers of the system 10 comprising a plurality of applications A, B and C (12, 14, and 16), a multi-modal shell API (application program interface) layer 18, a multi-modal shell layer 20 having a registration table 28, and an operating system layer 22 having conversational engines 24 and I/O resources 26.

In general, the multi-modal shell 20 manages information that is exchanged between a plurality of mono-mode applications. By way of example as shown in FIG. 1, the multi-modal shell 20 synchronizes information exchange between the speech application 16 and the GUI application 14. In addition, the multi-modal shell 20 manages information exchanges between multi-modal applications that are implemented with multiple application mode processes. For example, as shown in FIG. 1, the multi-modal shell 20 synchronizes information exchanges between a speech mode process 12*a* and GUI mode process 12*b* of the multi-modal application A 12. It is to be understood that other modalities (such as text-based only, handwriting input, body move/gesture input, etc.) may be implemented in accordance with the present invention and that the speech and GUI modalities discussed herein are for illustrative purposes.

Furthermore, as will be evident from the description herein, the multi-modal shell 20 can manage the synchronization for multiple device applications such as multi-device browsing as described below. Briefly, multi-device browsing involves browsing using different devices. For example, one device may be implemented for each modality (e.g., a telephone a for speech modality and a PDA or PC for a GUI modality). In addition, multi-device browsing may involve different devices for the same modality but different content (e.g., streaming to a monitor and text on a PDA/remote control). A multi-modal browser implementing a multi-modal shell to fundamentally just handle the browsers can be considered a virtual browser.

The applications 12, 14 and 16 interact with the multi-modal shell 20 via the shell API 18. More specifically, the multi-modal shell 20 coordinates the information exchange through API calls that allow each mono-mode application or each mode process of a multi-modal application to register its active commands and corresponding actions (both inter and intra mode processes as well as actions on other processes). Such registration may include any relevant arguments (i.e., data files used by the engines such as grammars, language models, vocabulary files, parsing, tags, voice-prints, TTS rules, etc.), to perform the appropriate task(s) associated with such commands.

In a preferred embodiment, the registration table 28 of the multi-modal shell 20 is a registry that is implemented as an "n-way" command/event-to-action registration table, wherein each registered command or event in the table indicates a particular action that results in each of the "n" devices/modalities that are synchronized and shared for the active application. By way of example, the registration table 28 of FIG. 1 may be considered a "two-way" registration table because of the two exemplary modalities, speech and GUI. In the illustrative embodiment of FIG. 1, the registration table 28 indicates what action results in both the speech mode process 12a and the GUI mode process 12b of the multi-modal application 12 or what actions result in both mono-mode applications (the GUI application 14 and the speech application 16) for a given command in one modality.

It is to be appreciated that if an application is written for multiple modalities (e.g., the application 12 having the speech and GUI modes 12a and 12b), and only one of the modalities is present (e.g., a GUI modality), the commands registered for the missing modalities will not be activated. An advantage, therefore, of implementing the registration table 28 and the multi-modal shell 20 is that the application developer can program a multi-modal application by including, in the first instance, all the information related to the different modalities supported by the application, and then rely on the multi-modal shell platform to manage, control and implement the modality specific rendering and synchronization when in interaction with the user.

It is to be appreciated that the multi-modal shell 20 with its application APIs 18 advantageously provides a mechanism for developing multi-modal applications, wherein multi-modal applications are written to the shell 20 using the shell APIs 18. In one embodiment, a multi-modal application may be developed by programming the registration table logic and programming the modality view as rendering applications or by using rendering platforms (e.g., browsers). In this embodiment, the programming of the multi-modal application is performed at the level of the interaction and commands in the registration table, independently of the modality or rendering device. In this manner, the actions are fully defined at the registration (and possibly updated during execution) and hook on each modality specific application or rendering platform.

In another embodiment, a multi-modal application may be developed from a mono-mode application using the multi-modal shell. In particular, an application developed for one modality (e.g., GUI), may be transformed to a multi-modal application by registering (with the shell) all the supported commands and their corresponding actions to expose one or more modalities. Each additional modality can then be supported by a particular application or by a particular rendering platform. For instance, the GUI application 14 in FIG. 1 may be voice enabled by registering the GUI menus and commands (via the shell API 18) with the registration table 28. The speech mode can then be supported by any speech application or speech rendering platform (e.g., a speech browser processing a speech markup language implemented in a declarative language), as well as any other platform/application that can provide/render the speech interface out of the registration table. In one embodiment, the speech application or speech rendering platform can be implemented by compiling the supported (registered) commands and building a speech command and control interface to support such commands. This can be done directly by just building on-the-fly a grammar for the registered commands to support the associated commands that are activated to the current state of the application/dialog. Each voice command is thereafter registered producing the same GUI event (e.g., clicking on the menu item). Alternatively, the speech application 16 can be transformed as a GUI application by registering the commands to synchronize and develop a GUI application or using a GUI rendering platform such as a GUI browser to support the associated commands.

It is to be appreciated that more advance systems involving other special short cuts or NL (natural language) support for the commands can be done either automatically or by having the application developer specifying how each command is to be registered and supported in the other modality. Indeed, the present invention readily affords multi-modal implementation of a conversational virtual machine (CVM) as disclosed in International Appl. No. PCT/US99/22927, filed on Oct. 1, 1999, entitled: "Conversational Computing Via Conversational Virtual Machine," (referred to herein as the "CVM Patent") which is commonly assigned, and fully incorporated herein by reference (which claims priority from U.S. Provisional Patent Application Ser. Nos. 60/102,957, filed Oct. 2, 1998, and 60/117,595, filed Jan. 27, 1999, which are commonly assigned and the disclosures of which are also expressly incorporated herein by reference), allowing each modality to be implemented as a full NL user interface, resulting in a universal conversational user interface. As described in the above-incorporated applications, a universal conversational user interface implies that a platform comprising the multi-modal shell can appropriately handle and synchronize the UI of devices or applications with different modes and provide the same UI for all user interactions, regardless of the access modality.

As indicated above, for a multi-modal application or mono-mode applications, the registration table managed by the multi-modal shell is used to register each of the active commands (speech or GUI) and corresponding actions in each of the supported (or registered) modalities. In a preferred embodiment, the registration process involves dynamically (on-the-fly) registering all the active commands and associated actions based on the state of the application/dialog or device. Thereafter, each action may modify (i.e., update) the table, for example, by adding new commands (via the shell APIs) and deleting or deactivating the commands that are no longer associated with the current state of the application/dialog.

It is to be understood that for each registered command and corresponding action for a given modality, the corresponding action in the other modality(ies) may be determined using various mechanisms. For instance, the application developer may specify such information by coding such information in the application code. Alternatively, the application developer can utilize components such as the "conversational foundation classes" (CFC) described in the above-incorporated CVM patent to automatically implement the commands in the other modality(ies). The application developer may also use dialog components, i.e., task-oriented dialogs as described, for example in the CVM patent. The CFCs and dialog components are designed to execute on top of the multi-modal shell and relieve the application developer the responsibility of having to register the correct commands and complete detailed tables for these portions of code. These components are typically dynamically linked (DLLs, linked libraries, libraries used at compilation, etc.) When such components are used in connection with a multi-modal browser (discussed below), upon parsing an input file (e.g., CML), the browser will register the commands, including the information needed by the other modalities.

The registration process also includes registering callback handles to notify each of the mode processes of completion of the action. The functions of the callback handles are coded by the application developer and integrated in the application code. Upon completion of an action, the callback handle triggers modification of the table and execution of a default entry that updates the state of each registered mode. The default entry is utilized to guarantee that upon completion of the call, the multi-modal shell can determine the next step and where to located the next step (e.g., what to update as a result of the completion of the call). When the function is completed and the function returns to the main code, it updates the tables and indicates after the update at the default entry position where to go to start updating the different modalities. The multi-modal shell immediately goes to such position to perform the update.

The multi-modal shell performs other functions such as detecting and managing audio and multi-modal I/O events (e.g., a spoken input, a click of the mouse, actuation of a keyboard key, a TTS (text-to-speech) output event, etc.), as well as managing and prioritizing the command/event table and callbacks. It is to be appreciated that all the features and functions for managing tasks, etc., as provided by a CVM (as described in the above-incorporated CVM patent and provisional applications) or conventional operating system may be implemented by the multi-modal shell. When a CVM platform is present, the multi-modal shell functions are incorporated within the dialog manager and task manager modules of the CVM kernel, and the I/O events are managed via the I/O manager (such modules and their corresponding functions are described in detail in the above incorporated applications). Moreover, with applications such as the multi-modal browser discussed below, the multi-modal shell functionalities may be directly incorporated in the browser application (as opposed to a separate shell application). In addition, rather than having the multi-modal shell built into an application or executing on top of a conventional operating system, it is to be appreciated that the functionalities of the multi-modal shell may be implemented utilizing DOM (Document Object Module), a currently emerging World Wide Web Consortium (W3C) standard known in the art that most browsers and operating systems are expected to support in the near future.

Figure 2:
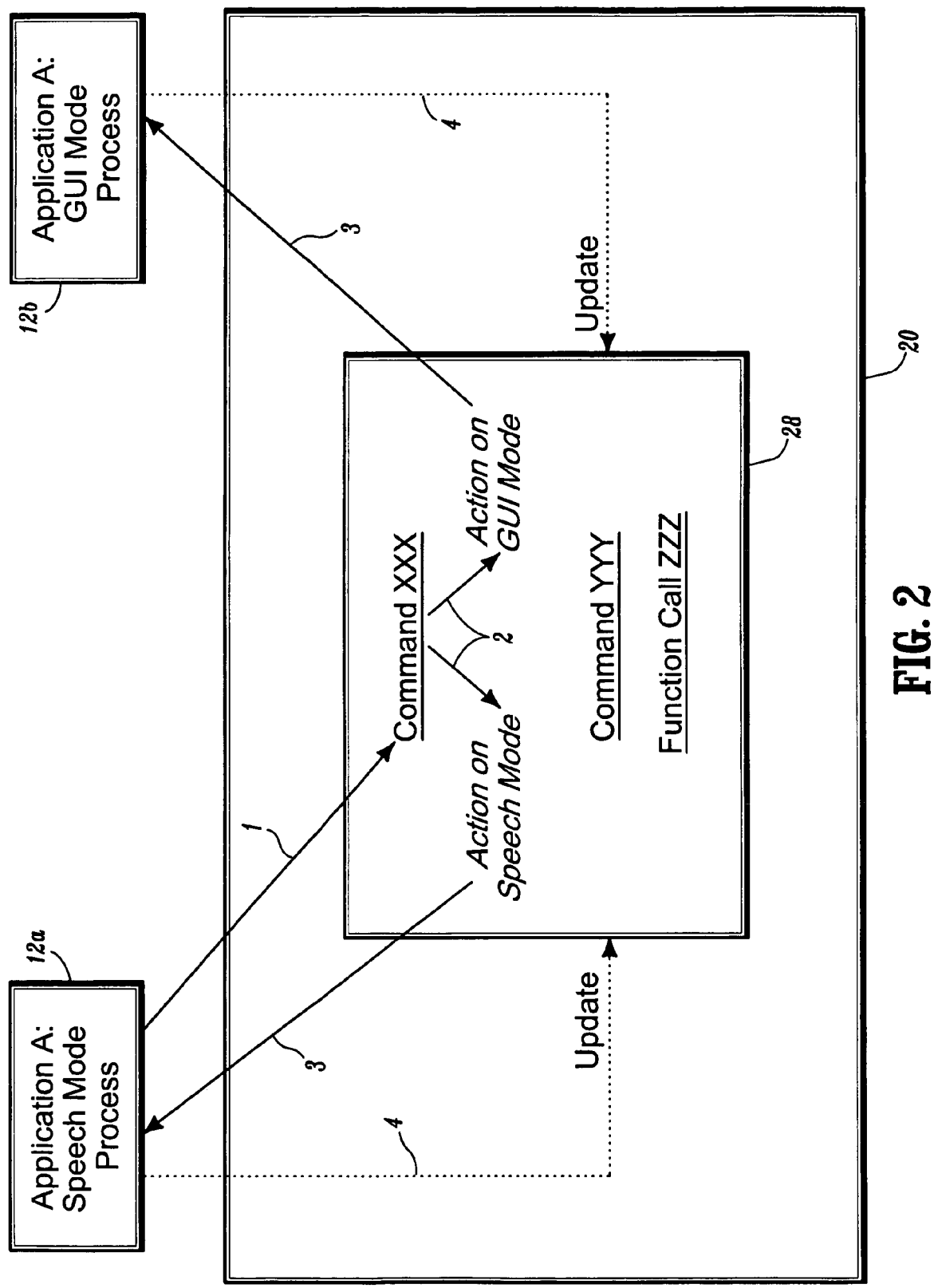
FIG. 2 is a diagram illustrating a method for synchronizing multiple mode processes according to one aspect of the present invention.
Figure 3:
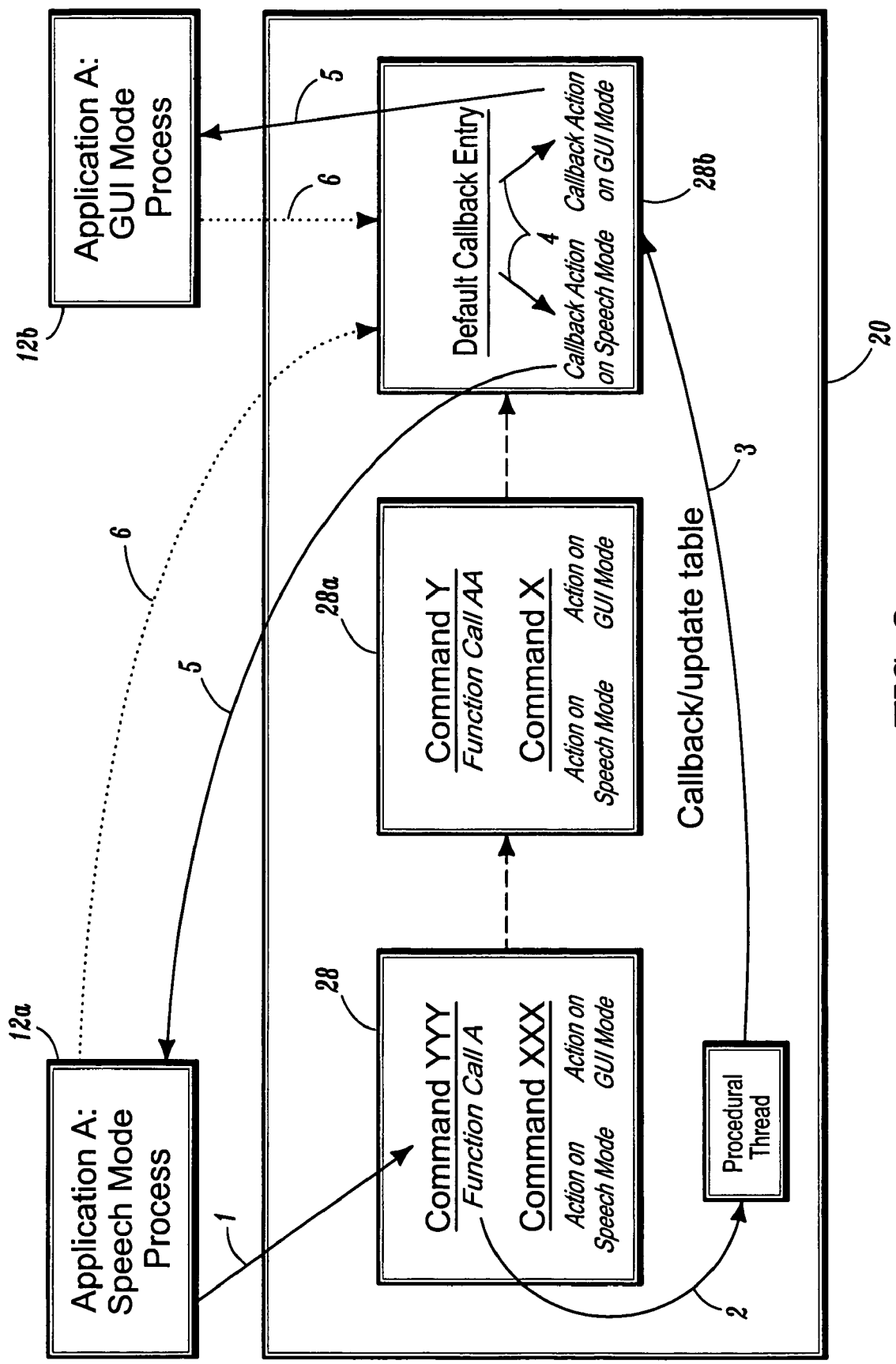
FIG. 3 is a diagram illustrating a method for synchronizing multiple mode processes according to one aspect of the present invention.

The diagrams of FIGS. 2 and 3 illustrate synchronization processes using the registration tables as discussed above. In particular, FIG. 2 is an exemplary diagram illustrating registration and synchronization between two modalities (speech mode 12a and the GUI mode 12 b) of a synchronized multi-modal application 12. It is assumed that the registration table 28 of the multi-modal shell comprises two registered commands (command XXX and command YYY) and a registered function call ZZZ. It is further assumed that an input event results in a change/input to the speech modality 12a, e.g., a speech command input by a user is recognized as command XXX via speech recognition or after a natural language dialog to disambiguate the command. The speech modality 12a notifies the multi-modal shell 20 of the command XXX, which activates the command XXX in the shell (as indicated by the line denoted "1"). Based on the actions that are registered for the given command XXX (as indicated by the lines denoted "2"), the command will result in an action in the speech modality 12a and a corresponding action in the GUI modality 12b (as indicated by lines denoted "3") so as to update the modalities accordingly. The update of the modalities may be followed by an update of the registration table 28 (as indicated by the lines denoted "4").

FIG. 3 illustrates a more complex situation where the activation of command YYY in the registration table 28 (as indicated by the line denoted "1") results into launching a function call A (procedural thread) in the shell (as indicated by the line denoted "2"). The function (or procedure, process, task, thread, etc.) is assumed to be a backend function or business logic action. For instance, the command YYY may be a command issued by a user to "check my mail", which command is executed by the procedural thread. The execution of the procedural thread results in an update of the registration table (from the state of the registration table 28 to the state of registration table 28a). For instance, the execution of command YYY may update the table (i.e., table 28a) to activate command (e.g., command X) for "edit", "browse" and "reply", etc. The registration table is updated when the dialog or application state changes to support new commands. It is to be understood that the business logic action may also result in interactions with the user such as a sub-dialog or even launching another parallel process that can be activated instead of the first process (i.e., the first process is suspended or interrupted) or activated in parallel to the current application or dialog.

In addition, a callback (indicated by line "3"), which results upon disambiguation of a query, causes the registration table 28a to be further updated to activate a "default call back entry." The activation of the "default callback entry" (indicated by the lines denoted "4" results in an update of each modality (e.g., display the available mail or announce the existence of new mail, if any) as indicated by the lines denoted "5". In addition, the update of each modality may be followed by a further update of the registration table 28b (as indicated by lines denoted "6").

It is to be appreciated that all types of multi-modal or mono-mode applications may be employed in connection with the present invention to provide synchronization between the UI of such applications. As discussed above, different mono-mode applications can be synchronized through the registration table of the multi-modal shell. In addition, the multi-modal shell with its shell APIs allows an individual to develop generic multi-modal applications. Furthermore, a multi-modal shell according to the present invention provides a mechanism to perform synchronized multi-device applications. For example, with multi-device browsing, instead of implementing different modality views on a single device, multiple devices each having a corresponding view may be implemented. With multi-device browsing, HTTP protocols, for example, can be used to synchronize the modality viewers with the multi-modal shell acting as a virtual browser. In the general case of multi-device synchronization (i.e., not only for browsing but with other applications with multiple views on different devices) the protocols are different. These concepts are further illustrated below with reference to the exemplary embodiments.

Figure 4:
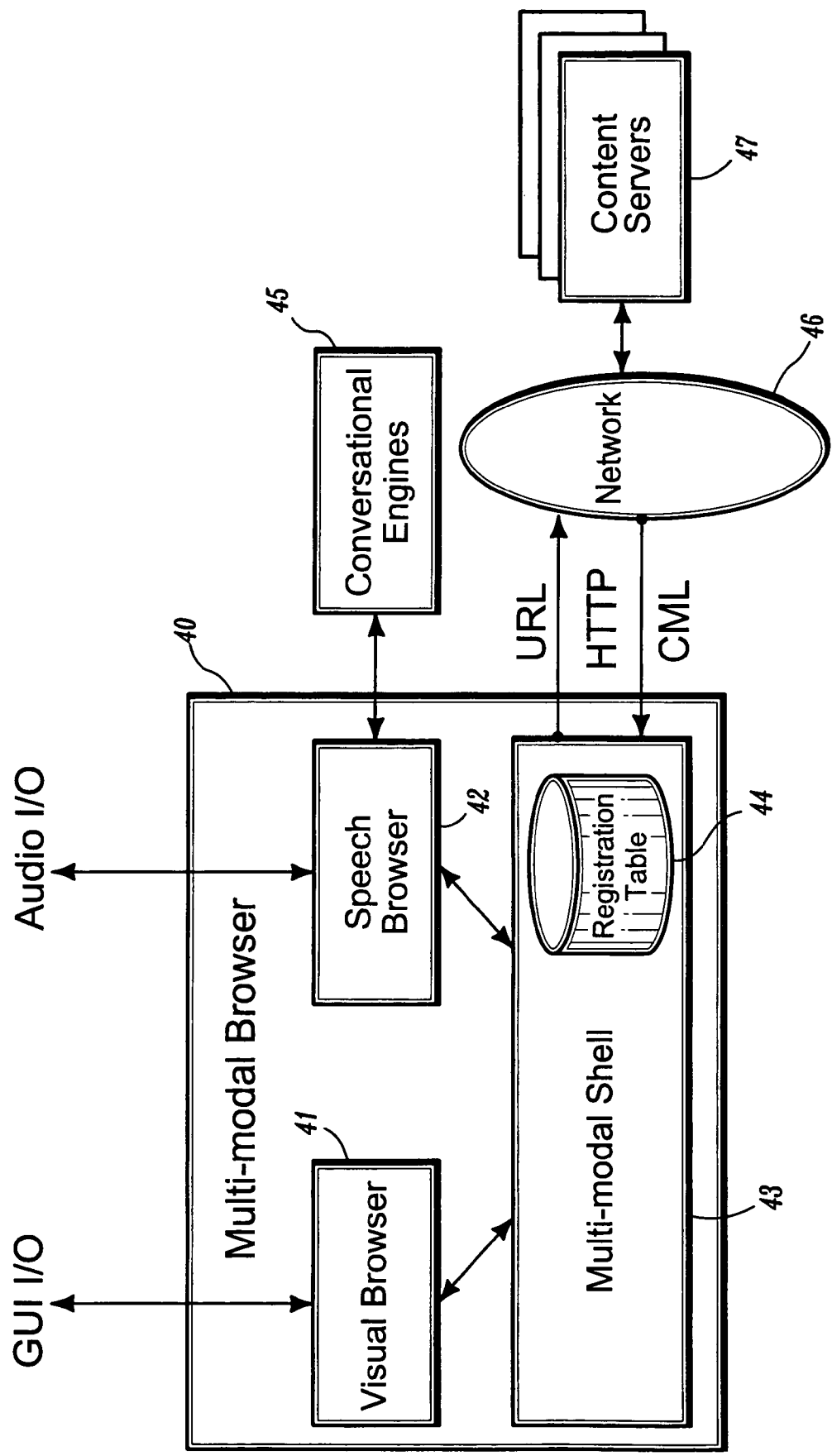
FIG. 4 is an exemplary diagram of multi-modal conversational browser employing a multi-modal shell according to an embodiment of the present invention.

Referring to FIG. 4, a multi-modal shell and corresponding shell APIs according to an exemplary embodiment may utilized for implementing a multi-modal browser. A multi-modal browser 40 according to an exemplary embodiment of the present invention comprises a visual (GUI) browser 41, a speech browser 43 and a multi-modal shell 43 having a registration table. It is to be understood that any conventional visual and conversational browser may be utilized for this purpose, as well as any other modes of rendering using distributed and non-distributed architectures. A preferred conversational browser that may be implemented in connection with the multi-modal browser, however, is disclosed in International Appl. No. PCT/US99/23008, filed on Oct. 1, 1999, entitled "Conversational Browser and Conversational Systems", which is commonly assigned, and fully incorporated herein by reference (which also claims priority from the above-incorporated U.S. Patent Application Ser. Nos. 60/102,957 and 60/117,595).

With the multi-modal browser 40 architecture, the multi-modal shell 43 functions as a virtual main browser which processes CML (conversational markup language) documents (e.g., content pages) retrieved over a network 46 (e.g., Internet) from various content servers 47. In general, a CML document in accordance with the present invention is a declarative page that contains all the information needed to build the interaction. A CML page comprises modality-specific information (including all the targeted UI) represented in a modality-independent manner. More specifically, a CML document comprises modality specific information as well as modality synchronizing information that is processed by the multi-modal shell to provide a synchronized multi-modal interface between mono-mode and multi-modal applications and devices. In addition, as described in further detail below, the modality specific information can actually be presented in a modality independent manner that is rendered according to the modality by the multi-modal shell when it parses the CML input. The multi-modal shell 43 parses a retrieved CML document to build the synchronization via the registration table 44 and send the relevant modality specific information (e.g., markup language) comprising the CML document to each browser 41 and 42 for rendering based on its interaction modality. Various embodiments for implementing CML are described below.

In general, each browser providing a different interaction modality (e.g., GUI browser 41 and conversational browser 43) will register its presence and UI capabilities with the multi-modal shell 43. This registration process is preferably implemented using the methods and protocols described in the above incorporated International Appl. No. PCT/US99/22927, "Conversational Computing Via Conversational Virtual Machine." Upon receiving a request for a page from either the visual or speech browser 41, 42, the multi-modal shell 43 will make the appropriate URL query using, for example, HTTP to retrieve a CML page from a corresponding content server 47 over a network 46 (e.g., the Internet).

The user can traverse a retrieved CML document by interacting with the application via one of the registered browsers. The conversational shell keeps track of currently open CML documents, as well as their corresponding application states. The multi-modal shell (or virtual browser) parses the CML files, registers the commands for each modality (or device) and will notify each registered client upon changes in state of a currently active application. These concepts will be described in further detail below.

It is to be understood that the term CML as used herein refers to any language that builds an application around the dialog. It is to be appreciated that a CML document may be implemented in one of various manners. In one embodiment, CML is implemented using a plurality of conversational gestures to model fundamental dialog components. More specifically, conversational gestures are elementary components that characterize the dialog interaction with the user (e.g., select, present, etc.). The use of conversational gestures affords abstract representation of the dialog independently of the characteristics and UI offered by the device or application rendering the presentation material. A more detailed discussion of conversational gestures is provided in the provisional application U.S. Ser. No. 60/158,777, filed on Oct. 12, 1999, which is commonly assigned and fully incorporated herein by reference.

Advantageously, conversational gestures allows a conversational interaction to be described independently of the platform, browser, modality or capability of the device. Each device, browser or platform is responsible for implementing the different gestures according to its capabilities. The conversational gestures can be directly transcoded/adapted to the modality present on a gesture-by-gesture basis. Regardless of the set of gestures that are used or the transcoding method employed, such an approach enables true multi-modal/multi-channel conversational portals. Conversational gestures may be implemented either declaratively (e.g., using XML (extensible markup language) to describe the dialog) or imperatively/procedurally. In this manner, the CML content can automatically be transcoded to any appropriate declarative language (e.g., HTML, XHTML, XML in general (for automated business-to-business exchanges), WML (wireless markup language) for wireless portals and VoiceXML. VoiceXML is a speechML that has been recently designed and proposed as a standard for declaratively describing the conversational UI for, e.g., speech browsers and IVR platforms. The implementation of the SpeechML as described in the above incorporated applications International Appl. No. PCT/US99/23008, and U.S. Patent Application Ser. Nos. 60/102,957 and 60/117,595 is VoiceXML (see, also, www.voicexml.org).

In another embodiment, CML may be implemented by embedding, e.g., VoiceXML (speech only ML) and HTML in the same file such as described in the above incorporated applications International Appl. No. PCT/US99/23008, and U.S. Patent Application Ser. Nos. 60/102,957 and 60/117,595. A CML page may also be implemented by combining two separate files with synchronizing anchor tags, or via a speech frame in the HTML page, also with synchronizing tags as discussed below. In any event, what is important in the case of declarative programming (i.e., using markup languages) of a CML document is that the document comprises a description of, e.g., the GUI modality, the speech modality and the synchronization information between the languages. This is the information that is used by the multi-modal shell to build the registration tables and describe the action of each command in each view. In general, the multi-modal browser can be viewed as a platform that processes the synchronization information in a CML document to appropriately build the registration table, and which relies on other rendering platforms to render each modality. It is to be understood that applets and other imperative/procedural components may be embedded in the declarative CML pages to provide the threads (e.g., function call and call-backs) as described above with reference to FIG. 3. In addition, these functions may be synchronized across the modalities using the same mechanism (two other applications).

In the embodiment where the CML document is implemented declaratively using embedded tags corresponding to the different modalities, the VoiceXML (speechML) portion of the CML document may be defined by tags which are based on XML, such as described in the above incorporated conversational browser patents. The primary tags are , <body>, <menu>, and <form>. Page elements group other CML elements, and serve as the top-level element for a CML document. Body elements specify output to be spoken by the browser. Menu elements present the user with a list of choices, and associate with each choice a target address (e.g., URL, socket address) identifying a CML element to visit if the user selects that choice. Form elements allow the user to provide one or more pieces of information, where the content of each piece of information is described by, e.g., a grammar. In addition, dialog (procedural) objects (such as applets) can be loaded in the declarative framework of the CML page. Moreover, multiple simultaneous forms for NL dialogs can optionally be loaded in a CML page. In this instance, the content can be described using a language model and tagging and parsing arguments instead of, or in addition to, a grammar. The form element also specifies a target address to visit when the user has completed the form (e.g., call to the back end logic). The conversational (speech) browser operates to parse the declarative framework (including the procedural specification) of a CML page and render its conversational UI to a user.

Although various embodiments exist for implementing CML, the following discussion considers a CML document comprising elements from each of the represented/supported modalities (e.g., GUI and speech). Referring again to FIG. 4, after downloading a CML page from the content servers, the multi-modal shell 43 parses the CML document. Upon parsing, the multi-modal shell 43 automatically associates each link or synchronization element to be followed to a new command that is added to the registration table 44. Thereafter, a registered link can thereafter be activated via a click event (mouse) or via speech by uttering the corresponding link command. Similarly, fields in a form can be filled either by keyboard input or by speech recognition, whereby key strokes fill the field character by character and spoken input is filled word after word. Additionally, each field is associated with other conversational arguments (grammar, vocabulary, language model, NLU arguments etc.) to complete the field via voice.

More specifically, by way of example, a link on the HTML content of the CML page is registered in the table 44 as an action to fetch the linked HTML page and load it in the GUI browser 41 and fetch the corresponding VoiceXML page and load it in the conversational browser 42. Conversely, a link in a VoiceXML menu is registered in the table as a HTML page to load in the GUI browser 41 and a SpeechML page to load in the Speech browser 42. Furthermore, a field input (with a grammar, language model or NLU on the VoiceXML side) is registered in the table so that keyboard inputs are displayed on the appropriate field space of the GUI browser 41 but do not affect the speech browser 42 (it is to be understood that these synchronized commands are completely described in the CML file which is parsed by the multi-modal shell to register such commands). Furthermore, a form input in the speech browser 42 is synchronized with an HTML page such that each recognized word is displayed on the GUI browser 41 in the field. Upon completion of a field in a speech form, the form can be automatically or manually sent. Upon being sent, a new speechML and a new HTML page are loaded in the respective browser by the server CGI or servlet application. Non-synchronized pages or elements are not associated for display in the GUI browser (i.e., same page or page element may have one modality and no correspondence in another modality, etc.)

It is to be appreciated that synchronization between elements of the speechML and HTML pages can be obtained in different fashions. As indicated above, in one embodiment tags are embedded to synchronize VoiceXML content with the HTML content on an element-by-element basis such as described in the following example:

<MM><speech> . . . Voicexml content</speech> . . . . HTML content . . . </MM>, where the content between corresponding MM tags specifies synchronized content, and where the speech tags specify Voicexml content. In this example, there are no GUI tags since the HTML content is identified by default. It is to be understood, however, that GUI tags may be included to identify the HTML content.

Instead of using GUI and speech, the name space may be directly used as follows:

<MM><HTML> . . . . HTML content . . . </HTML><VoiceXML> . . . VoiceXML content . . . </VoiceXML></MM>;

or if the name spaces are appropriately defined directly:

<MM><tag_for_HTML.HTML> . . . </tag_for_HTML.HTML><tag_for_VoiceXML. VoiceXML> . . . </tag_for_VoiceXML.VoiceXML></MM>.

In addition, when multiple files are used or when a voice frame is used, synchronization may be obtained via anchor tags such as follows:

html file:

. . . HTML tags 1

<speech href="http://..speechmlfile.VoiceXML#speechml1">

<#html1>HTML tags to synchronize</#html1>

</speech>

. . . HTML tags 2

VoiceXMLfile:

. . . VoiceXML tags1

<html href="http://.. speechmlfile.html#html1">

<#speechml1>VoiceXML tags to synchronize</#speechml1>

</html>

. . . VoiceXML tags 2

In this example, the <#speechml1> and the <#html1> tags indicate anchor points in HTML and VoiceXML, respectively, i.e., the location in the pointed file where to position the browser, or in this case, the object to synchronize with the other modality. This is an example where a CML document is encoded into multiple files with one file for each modality: a file for the speech modality (.speechML) and a file forth GUI modality (.html).

It is to be understood that the same implementation may be used for a voice frame in each page and similar synchronization between the frames using anchors. An advantage to using the same file (with embedded MM tags) simplifies the preparation of the CML page. An advantage to using multiple files is that it allows asynchronous mode between the GUI browser and speech browser: the content of the two browsers could evolve independently of each other. In addition, especially in the case of separate files, other ML formats can be used (other than just VoiceXML and HTML) to generate a CML document. For example, WAP (Wireless Application Protocol) as another ML input like DHTML, which with tags allows, for example, to synchronize the GUI browser and speech browser to change the color of the GUI fonts as they are read with the speech browser. It is also possible to have each of the files associated with different synchronized browsers on different devices instead of different synchronized modalities. An advantage of using a single file, however, over multiple files is that it may not be possible or practical in certain situations to have multiple streams transmitted simultaneously to the same device due to bandwidth considerations, embedded processing capabilities, etc.

It is to be appreciated that the present invention may be implemented with any conventional visual markup languages such as HTML, CHTML (compact HTML) used for embedded/pervasive hand held devices and WML (wireless markup language), as well as any conventional aural markup languages such as VoiceXML. In addition, the present invention may be implemented with the modular architecture of XHTML (extensible HTML), where different markup modules cohabitate and interoperate within an overall XHTML container. As such, the present invention is configured to incorporate multiple visual and aural markup languages to form multi-modal documents (i.e., documents that contain sub-documents from different interaction modalities). In accordance with the present invention, such multi-modal documents are transformable to standalone documents for specific interaction modalities by standard tree transformations as expressible in the known standards XSLT or XSL. Indeed, by transforming a multi-modal document to a document of a given modality, this will ensure content reuse as well as provide accessibility requirements (e.g., a multi-modal documents designed with combined visual and aural modalities should be usable in environments where only one modality is available.

Conversely, multi-modal documents (e.g., gesture-based CML) that have been authored to achieve explicit synchrony across the interaction streams and contain document elements for each interaction modality should be viewed as a simple transformation applied to the individual sub-documents, with the transformation playing the role of tightly coupling the sub-documents into a single document.

The present invention accommodates a loosely-coupled document approach, with separate voice and visual markup streams synchronized at various well-defined points. The term "loosely-coupled" as used herein refers to providing synchronization by explicit links between the different files associated with each modality. In other words, the synchronization is limited to HTTP calls of one of the browsers associated with one modality to the backend server. When the new page is fetched, the corresponding page in the other modality is loaded. Accordingly, the synchronization is more "loose" than if the synchronization is performed on a gesture-by-gesture basis or by using tighter tags (e.g., the <MM> . . . </MM> tags).

For "loose synchronization, the present invention provides synchronized interaction across multiple streams of concurrent multi-modal output. More specifically, synchronization is enabled across different interaction modalities at well-known interaction points in conventional browsers, e.g., following a link, or filling in a form field. In one embodiment, synchronization points are the event types defined by the DOM (document object model) event model, appropriately modified to be modality independent. At a minimum, synchronization points should include entering and exiting specific interaction widgets such as, entry to a form, entry to a menu, completion of a form, and choosing a menu item (voice XML) or link (HTML). In addition, other synchronization points may include filling of a field, start/finish voice output events (word, line paragraph, section). Furthermore, finer-grained synchronization should exist at the interaction level, e.g., allow the visual browser to synchronize with events in the aural output stream, allow the auditory browser to synchronize with scrolling event in the visual browser, etc.

More tightly coupled documents (e.g., with voice and visual markup elements interspersed in the same document) should be viewed as an optimization of the loosely-coupled approach. A tightly coupled document contains information for each modality as well as information for tight-coupling between the modalities. Although at the level of the multi-modal shell multiple ML documents (one for each modality) may be generated from the tightly-coupled document (i.e., each of the ML modalities are separated out), the synchronization information is utilized to provide tight synchronization between the modalities.

Figure 5:
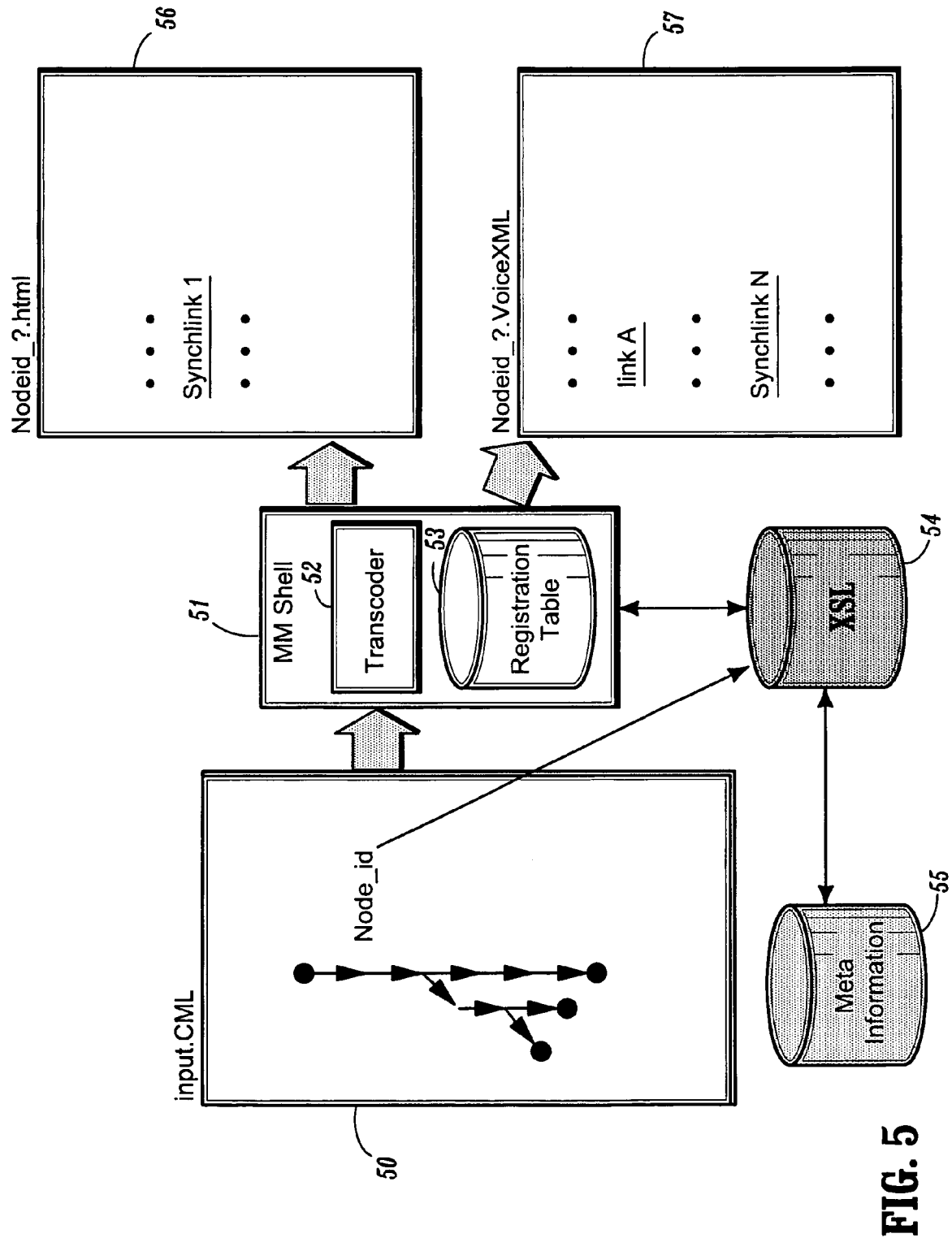
FIG. 5 is a block/flow diagram of a system/method for providing multi-modal browsing utilizing a conversational markup language employing tight synchronization between mono-mode browsers.

Referring now to FIG. 5, a diagram illustrates a system/method for providing multi-modal browsing according to one aspect of the present invention utilizing a CML implementation (e.g., a multi-modal/gesture based CML as described in the above-incorporated U.S. provisional application Ser. No. 60/158,777) with tight synchronization across at least two modalities or devices according to one aspect of the present invention. An input CML file 50 is fetched by the multi-modal browser from a content server using any conventional transport protocol, e.g., HTTP, WAP, Bluetooth, etc. The input CML file 50 is illustrated as comprising a sequence of elementary dialogs, with each of the dialog components (i.e., gestures) comprising the entire dialog. The "dots" represent the different gestures (gesture-based CML) as encoded in the CML page. The arrows represent the flow of the dialog declared in the CML page. In particular, when expressed graphically, the dialog is represented by a tree, i.e., sequential list of gestures with bifurcation (and possible loops).

Each component gesture (i.e., node) in the CML file 50 is tagged with a specific node_id, e.g., an infix, or prefix path across the tree, or any other numbering). The multi-modal shell 51 keeps track of each node_id and the tree/graph structure of the CML file 50 to build the registration table 53. The multi-modal shell 51 comprises a transcoder module 52 for dynamically transcoding each gesture (dialog component) based on its type/nature into a corresponding component for each of the registered modalities (e.g., GUI and speech). For instance, as illustrated in FIG. 5, the gesture/dialog component that is tagged with the node_id is dynamically transcoded to an HTML component 56 and a VoiceXML component 57, which are shipped to their respective presentation browsers (e.g., the visual browser and speech browser, respectively) for rendering. The pages 56 and 57 are synchronized in the sense that any event on one of the gestures in one of the browsers is sent to the multi-modal shell which utilizes the graph/tree to determine how to update the page (e.g., by transcoding a new node_id, or by following a link and updating the entire CML page).

The dynamic transcoding from CML to synchronized modality pages is achieved using transcoding rules (e.g., XSL rules) stored in database 54. Each gesture/dialog component in the CML file is associated with a default XSL rule. The transcoding rules in database 54 can be overwritten based on meta-information stored in a local database 55 of the device. The meta-information may include, for example, device/browser preferences (e.g., capability-based information regarding the capabilities of the device), user preferences/customizations, and application preferences. In addition, such transcoding rules may be overwritten by downloading new XSL rules from the content provider of the CML page (e.g., as indicated via a URL in the CML file). Accordingly, it is also possible to extend the list of gestures by providing similarly the associated XSL rules.

It is to be understood that the CML file 51 may include tags and fields directly related to certain modalities (e.g., grammar and other conversational arguments (data files needed by the speech modality)) to transfer the appropriate information from one modality to another. Furthermore, additional anchoring points (synchlink 1 in the HTML page 56 and synchlink N in the VoiceXML page 57 an be included to synchronize and notify the state of each viewer. For example, when the speech browser reaches a synchlink N, the characters up to the link in the speech browser may change color, etc.). Each of the links and synchronization links in the specific modality pages refer to links in the multi-modal shell.

With reference to FIGS. 4 and 5, the following describes a method for processing UI event notifications in the multi-modal browser according to one aspect of the present invention. Upon downloading a CML page, the multi-modal shell will notify each of the registered browsers via an "event notification." This notification includes a node_id in the CML tree structure as described above. Upon notification, each of the registered browsers will send a query to the shell (typically an HTTP query or WAP (for a wireless network)). In response, the multi-modal shell will send the page associated with the requested node_id appropriately transformed using the transformation rules associated with the node as explained above.

The following describes the process flow when a synchronization link is selected (i.e., a link introduced to notify processing of the page up to this location). Assuming a speech synchronization link (synchlink N FIG. 5) is reached (e.g., the page was read up to that link by the speech browser), the speech browser will send a notification event with the node_id and link_id to the multi-modal shell. The link_id indicates what link was reached, clicked, activated, etc. (each synchronization link has a link_id associated therewith). The multi-modal shell will then compute the new node_id and then transform the CML node_id for each modality. The shell will then send an event notification to each registered browser. The browsers will react by requesting the new document and the shell sends the new transformed node_id to each browser. A weak link may be provided to allow one of the browsers do decide not to update its content. A weak link is a mechanism by which a browser is first informed (via an API call or protocol) which part of the page is to be updated. The browser may decide not to update, for example, when the event affects potions of the page that are not displayed at that moment and keep reference to update when/if it is displayed.

The following describes the process flow when an external link is selected (e.g., filled field or form, completed menu). An external link is a link that results in a new page being fetched from the content server. When an external link is selected, the corresponding browser will send a notification event with the node_id and link_id to the shell. The shell will then fetch the new CML page and compute the new node_id, transforms the CML node_id for each modality, and then send an event notification to each registered browser. In response, the browsers will request the new document and the shell will send the new transformed node_id to each browser. Again, a weak link may allow one of the browse to decide not to update its content.

The following describes the process flow associated with a browser event (e.g., an input was given to a form field on the speech side or a character was entered on the GUI browser field side, or a word has been read to the user). The corresponding browser will send a notification event with node_id and link_id to the shell. The shell will either compute the new node_id or fetch a page and transform the CML node_id for each modality. The shell will then send an event notification to each registered browser. In response, the browsers will request the new document and the shell will send the new transformed node_id to each browser. The weak link may allow one of the browsers to decide not to update its content.

It is to be appreciated that various architectures may be employed for implementing a multi-modal browser according to the present invention. For instance, with the topology illustrated in FIG. 4, it is assumed that all the functions and modules of the multi-modal browser 40 are located on a client device or machine. It is to be understood, however, that the conversational engines 45 may be local to the client device or machine, or may be distributed over the network 46.

Figure 6:
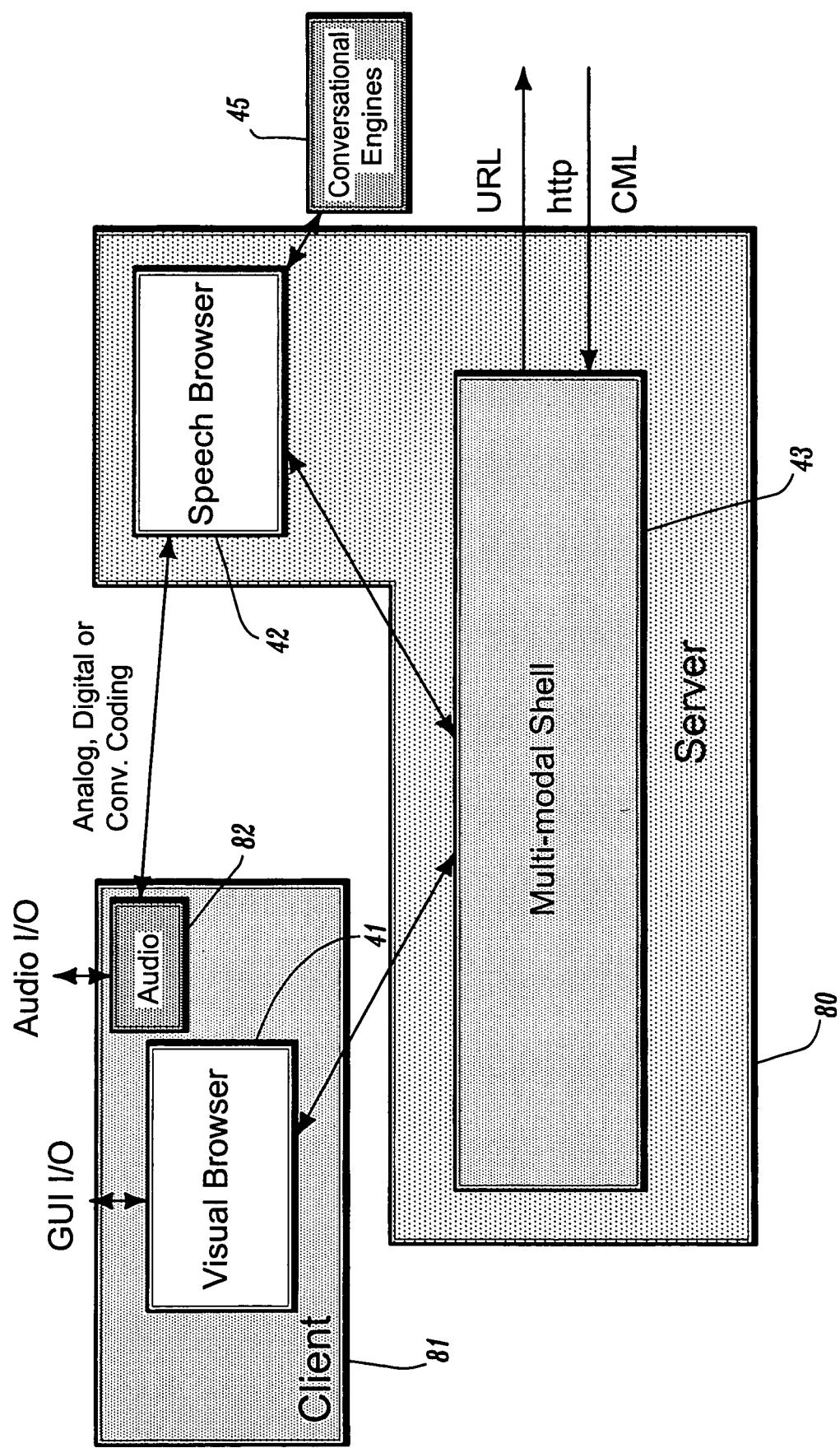
FIG. 6 is a block diagram illustrating an architecture of a multi-modal browser according to another embodiment of the present invention.

FIG. 6 illustrates an alternate topology, wherein the visual browser 41 is located on a client device or machine 81 and the speech browser 42 and multi-modal shell 43 are located on a server 80. The conversational engines 45 may be local to the server 80 or distributed over the network. In addition, an audio capture module 82 is shown as being located on the client 81. The captured audio may be transmitted to the server 80 via analog, digital or conversational coding techniques such as described in the above incorporated patents. It is to be understood that in distributed cases, the shell APIs are implemented as distributable or remotable APIs or protocols.

Figure 7:
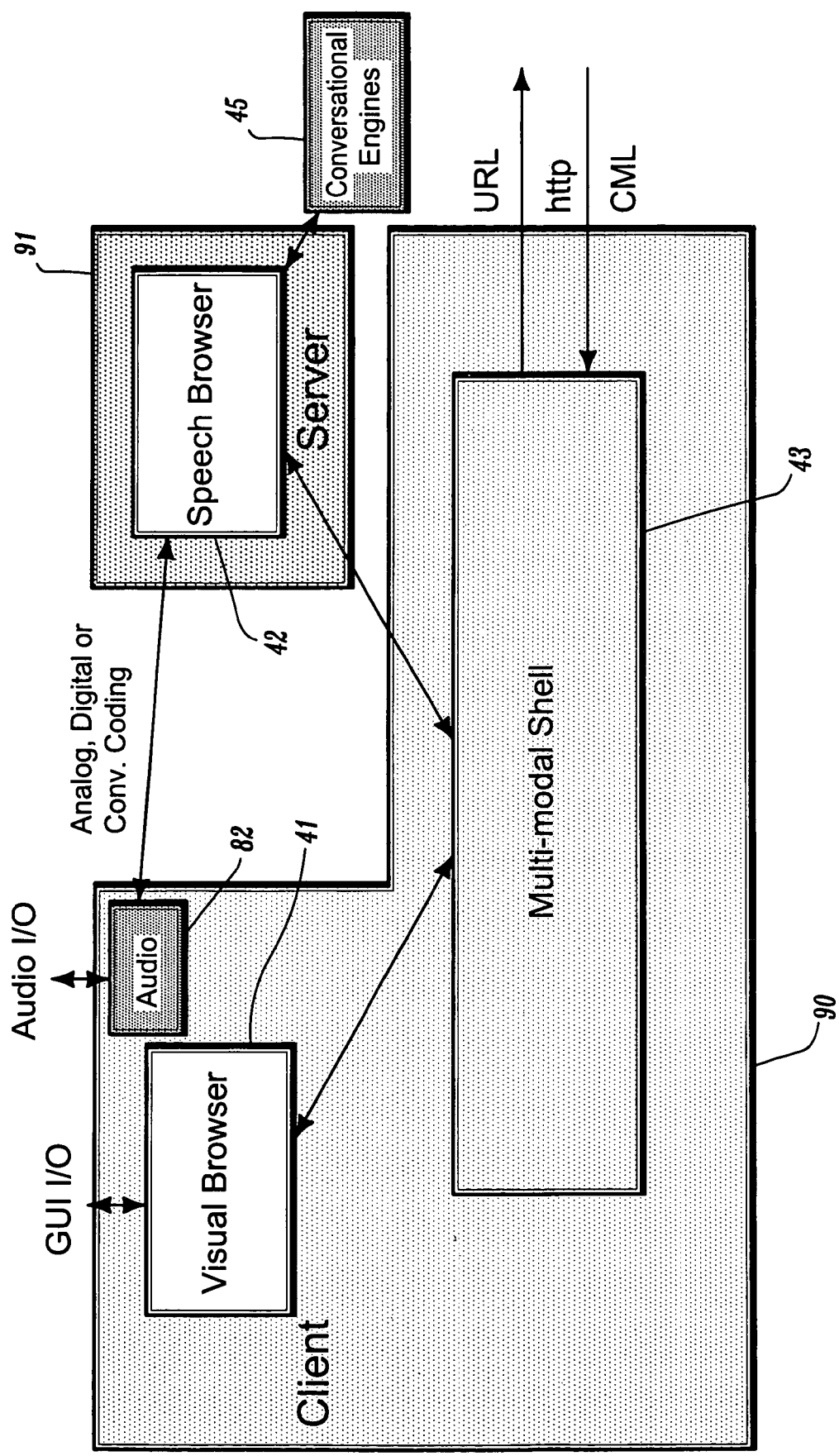
FIG. 7 is a block diagram illustrating an architecture of a multi-modal browser according to another embodiment of the present invention.

FIG. 7 illustrates an alternate topology, wherein the visual browser 41, audio capture 82 and multi-modal shell 43 are located on a client device or machine 90 and the speech browser 42 is located on a server 91. Again, the conversational engines 45 may be local to the server 91 or distributed over the network. In addition, the captured audio may be transmitted to the server 91 via analog, digital or conversational coding techniques such as described in the above incorporated patents.

Figure 8:
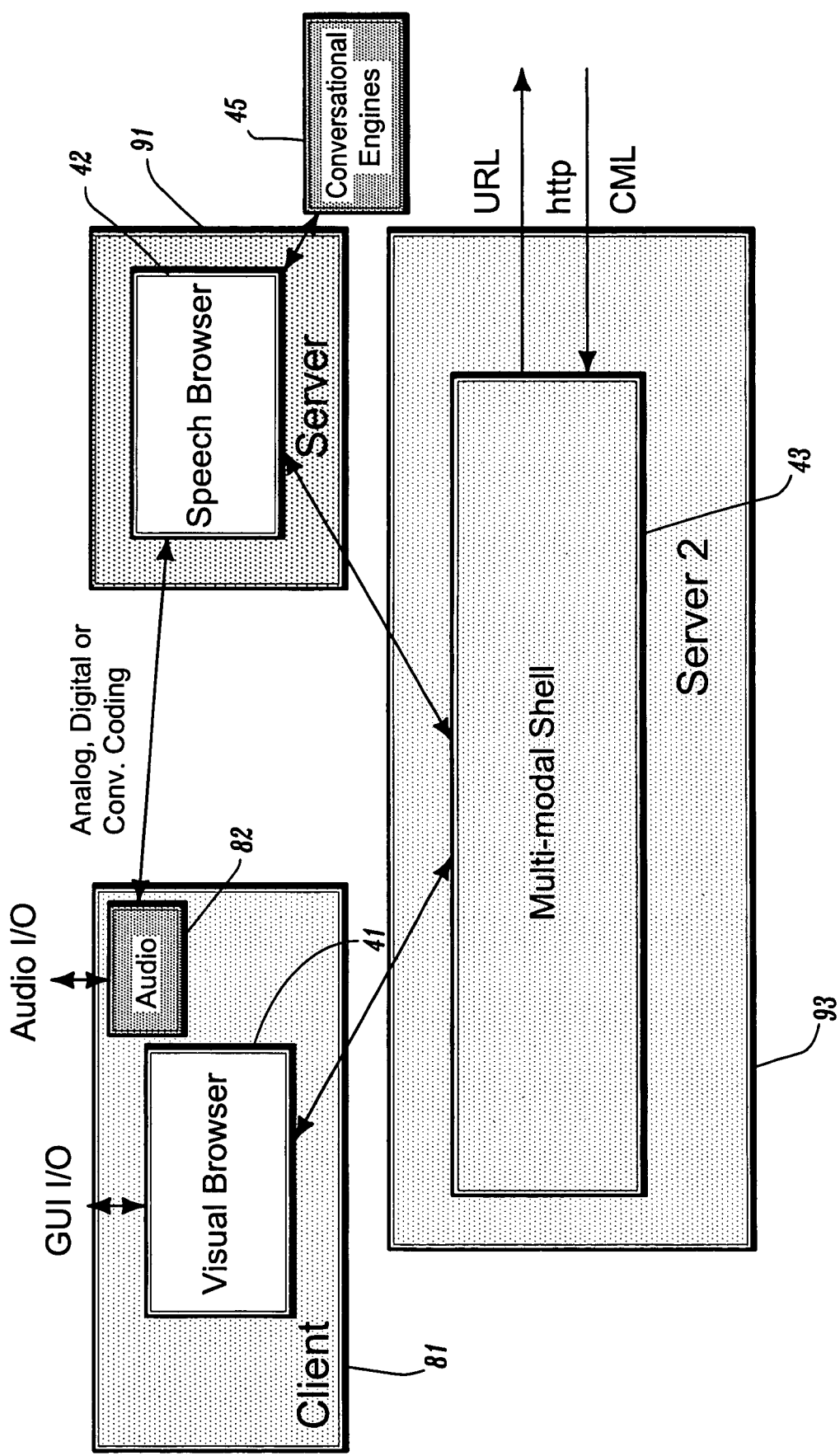
FIG. 8 is a block diagram illustrating an architecture of a multi-modal browser according to another embodiment of the present invention.

FIG. 8 illustrates an alternate topology, wherein the visual browser 41 and audio capture 82 are located on the client device or machine 81, the speech browser 42 is located on the server 91 (the conversational engines 45 may be local to the server 91 or distributed over the network) and the multi-modal shell 43 is located on another server 93. In addition, the captured audio may be transmitted to the server 91 via analog, digital or conversational coding techniques such as described in the above incorporated patents. Furthermore, conversational functions and resources may be shared by local and remote (server) applications/devices using the techniques and protocols described in International Application No. PCT/US99/22925, filed on Oct. 1, 1999, entitled "System and Method For Providing Network Coordinated Conversational Services," which is commonly assigned and incorporated herein by reference.

It is to be understood that the distributed/non-distributed multi-modal browser topologies described above are for purposes of illustration. Those of ordinary skill in the art can readily envision architectures (other than multi-modal browsing) using a multi-modal shell to implement distributed/non-distributed multi-modal applications based on the teachings herein.

Figure 9:
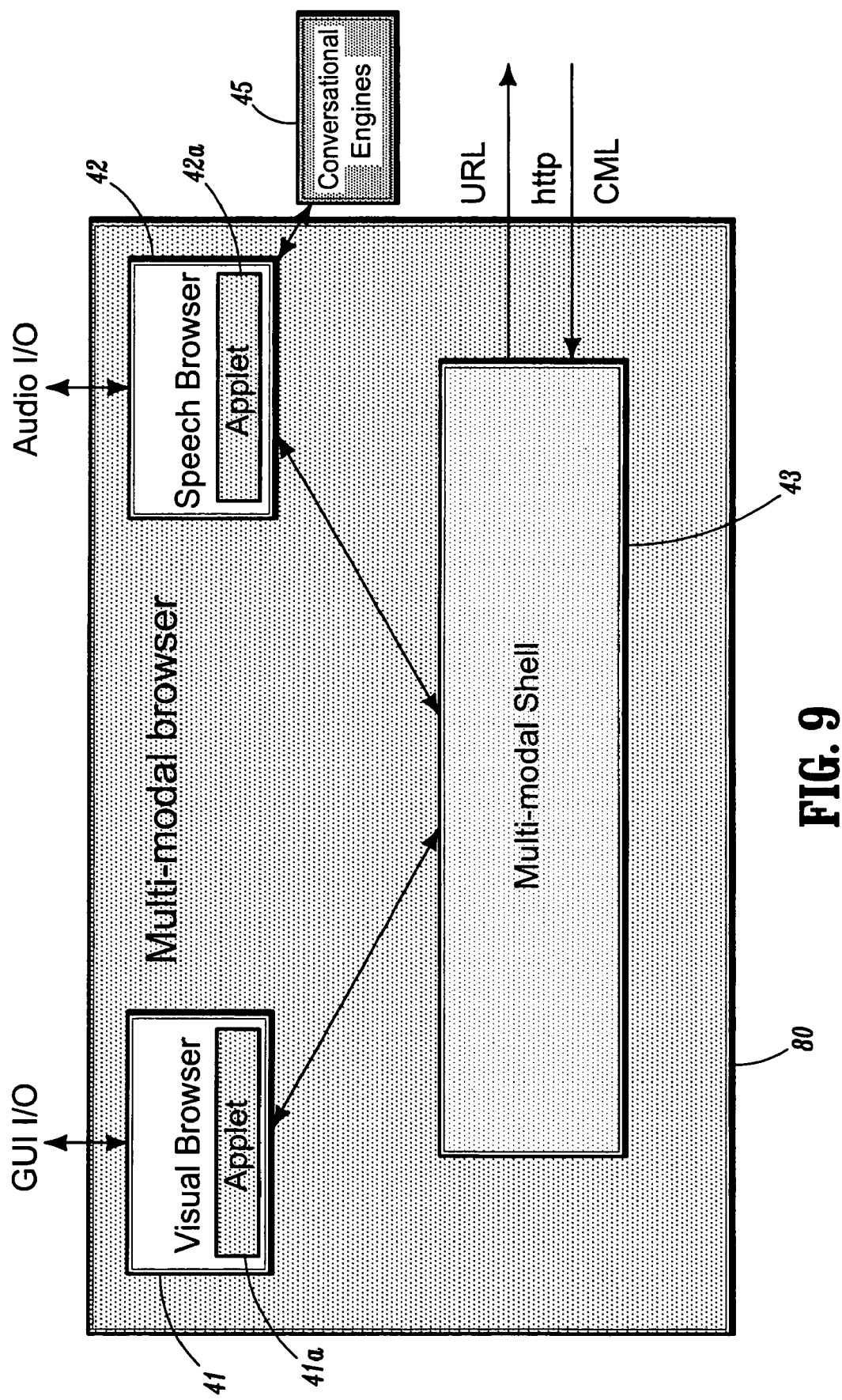
FIG. 9 is a block diagram illustrating an architecture of a multi-modal browser according to another embodiment of the present invention.

Referring now to FIG. 9, a diagram illustrates an alternate embodiment of a multi-modal browser according to the present invention. In this embodiment, the multi-modal browser can be implemented with legacy speech and GUI browsers having local applets or scripts (e.g., Javascripts) components that perform the synchronization between the browsers. In particular, each browser can load an applet or a plug-in (or script like java script) that directly has a socket connection to the other browser. Consider the issue of following links. Any command given to one browser (speech for speech browser, GUI for GUI browser) results into following the links in both browsers. Upon loading its corresponding page in one of the browser modes, it loads an applet that fetches the corresponding page in the other modality and pushes it (push technology via API pushes (e.g., DOM) or protocol pushes (e.g., HTTP) to the other browser. So a link click loads the HTML page on the page that contains an applet which fetches the speechML pages and pushes it to the speech browser. The converse happens when a menu link is followed by voice. If push technology via socket is not available on the browser implementation, let us consider the first case of a clicked link. The applet loaded in the GUI browser gets the associated speechML URL and sends a socket request to the applet in the speech browser to load the corresponding SpeechML URL.

In the case of this second embodiment, a shell need not be explicitly implemented. Rather, the function of coordination between the two process modes can be implemented by the two applets or plug-ins (or scripts) loaded by the browsers. In effect, each applet, upon receipt of a command, communicates the command to the second applet which modifies the second mode appropriately. This has the effect of also updating each.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A system for synchronizing multi-modal interactions, comprising:
a program storage device that stores a multi-modal application, the multi-modal application comprising at least a first mode process that enables user interaction with the application in a first modality and a second mode process that enables user interaction with the application in a second modality;
a program execution system that executes the multi-modal application and synchronizes the first and second mode processes while a user interacts with the multi-modal application, wherein the program execution system comprises:
a multi-modal shell that manages information exchanges between the first and second mode processes of the multi-modal application to enable a synchronized multi-modal interaction with the multi-modal application wherein user interaction in one modality results in execution of corresponding commands in both the first and second mode processes; and
an API (application program interface) that allows the first and second mode processes to register their respective active commands and corresponding actions with the multi-modal shell.

2. The system of claim 1, wherein the program execution system comprises a registry having a registration table, managed by the multi-modal shell, wherein the registration table comprises a list of each of the registered commands and corresponding synchronized actions that results in both the first and second mode processes upon execution of a registered command by one of the first and second mode processes.

3. The system of claim 1, wherein the multi-modal application comprises at least a first mono-mode application for the first mode process and a second mono-mode application for the second mode process, wherein the multi-modal shell manages and synchronizes information exchanges between the first and second mono-mode applications.

4. The system of claim 1, further comprising at least a first device having a first user interface modality and a second device having a second user interface modality, wherein the multi-modal shell manages and synchronizes information exchanges between the first and second devices.

5. The system of claim 4, wherein the first device, second device and multi-modal shell are distributed over a network, and wherein the API is implemented using distributed APIs or protocols.

6. The system of claim 2, wherein the API comprises a mechanism for converting a mono-mode application to a multi-modal application.

7. The system of claim 6, wherein the mono-mode application is a GUI application, and wherein the mechanism provides speech enablement of the GUI application by registering the active commands of the GUI application and building a grammar for the registered commands to support the commands in a speech modality.

8. The system of claim 2, wherein the API comprises a mechanism for building a multi-modal application.

9. The system of claim 8, wherein the mechanism is used for directly programming the registry by building a registration table having user-defined commands and corresponding actions for each of the modalities of the multi-modal application.

10. The system of claim 1, further comprising an operating system, wherein the multi-modal shell executes on top of the operating system.

11. The system of claim 1, wherein the system is distributed over a network.

12. The system of claim 1, wherein the multi-modal application is a multi-modal browser comprising a first browser application and a second browser application.

13. The system of claim 12, wherein the first browser is a GUI browser and the second browser is a speech browser.

14. The system of claim 12, wherein the multi-modal shell processes the multi-modal application to send modality-specific presentation information to the respective browsers.

15. The system of claim 14, wherein the multi-modal application is authored using a modality-independent description and wherein the multi-modal shell generates the modality-specific presentation information from the modality-independent description.

16. The system of claim 14, wherein the multi-modal application comprises a combination of declarative markup languages to describe the first and second mode processes.

17. The system of claim 16, wherein the multi-modal application combines the declarative markup languages and synchronization elements in single pages to provide tight synchronization between the first and second mode processes.

18. The system of claim 16, wherein the multi-modal application comprises separate files of the declarative markup languages for the first and second mode processes and wherein the separate files are loosely synchronized at predefined points.

19. A method for synchronizing multi-modal interactions, comprising the steps of:
    activating a multi-modal application comprising at least a first mode process that enables user interaction with the application in a first modality and a second mode process that enables user interaction with the application in a second modality
    receiving a command or event in the first modality;
    triggering an action by the first mode process based on the received command or event and triggering a corresponding action by the second mode process; and
    updating application states or device states associated with the first and second mode processes.

20. The method of claim 19, further comprising the steps of:
    registering active commands associated with the first mode process and active commands associated with the second mode process;
    associating, with each registered command of the first mode process, an action on the first mode process and a corresponding action on the second mode process; and
    associating, with each registered command of the second mode process, an action on the second mode process and a corresponding action on the first mode process.

21. The method of claim 20, further comprising the step of building a command-to-action registration table based on the registered commands and actions.

22. The method of claim 21, wherein the registration table is built by a multi-modal shell via API calls from the applications or devices associated with the first and second mode processes.

23. The method of claim 20, wherein the step of triggering comprises the steps of:
    looking up the received command in the registration table; and
    executing the actions associated with the received command by the first and second mode processes.

24. The method of claim 20, further comprising the steps of:
    registering a callback handle for each of the registered commands to notify the first and second mode processes of completion of the actions corresponding to the registered commands.

25. The method of claim 24, wherein the step of updating the application states or the device states comprises the steps of executing the callback handle associated with the received command to trigger a callback action on the first mode process and a callback action on the second mode process.

26. The method of claim 19, wherein the step of triggering comprises the steps of:
    executing first thread associated with the received command; and
    triggering a corresponding second thread to initiate the corresponding action by the second mode process.

27. The method of claim 26, wherein the threads are applets.

28. The method of claim 26, wherein the threads communicate via socket connections.

29. A program storage device readable by a machine, tangibly embodying a program of instructions executable by the machine to perform method steps for synchronizing multi-modal interactions, the method comprising the steps of:
    activating a multi-modal application comprising at least a first mode process that enables user interaction with the application in a first modality and a second mode process that enables user interaction with the application in a second modality
    receiving a command or event in the first modality;
    triggering an action by the first mode process based on the received command or event and triggering a corresponding action by the second mode process; and
    updating application states or device states associated with the first and second mode processes.

30. The program storage device of claim 29, further comprising instructions for performing the steps of:
    registering active commands associated with the first mode process and active commands associated with the second mode process;
    associating, with each registered command of the first mode process, an action on the first mode process and a corresponding action on the second mode process; and
    associating, with each registered command of the second mode process, an action on the second mode process and a corresponding action on the first mode process.

31. The program storage device of claim 30, further comprising instructions for performing the step of building a command-to-action registration table based on the registered commands and actions.

32. The program storage device of claim 30, wherein the instructions for performing the step of triggering comprise instructions for performing the steps of:
    looking up the received command in the registration table; and
    executing the actions associated with the received command by the first and second mode processes.

33. The program storage device of claim 30, further comprising instructions for performing the steps of:
    registering a callback handle for each of the registered commands to notify the first and second mode processes of completion of the actions corresponding to the registered commands.

34. The program storage device of claim 33, wherein the instructions for performing the step of updating the application states or the device states comprise instructions for performing the step of executing the callback handle associated with the received command to trigger a callback action on the first mode process and a callback action on the second mode process.

35. The program storage device of claim 29, wherein the instructions for performing the step of triggering comprise instructions for performing the steps of:
  executing first thread associated with the received command; and
  triggering a corresponding second thread to initiate the corresponding action by the second mode process.

36. The program storage device of claim 35, wherein the threads are applets.

37. The program storage device of claim 35, wherein the threads communicate via socket connections.

* * * * *